United States Patent
Angel et al.

(10) Patent No.: US 12,162,357 B2
(45) Date of Patent: Dec. 10, 2024

(54) DRIVE PLATE CONFIGURATION FOR TORQUE CONVERTER

(71) Applicant: Schaeffler Technologies AG & Co. KG, Herzogenaurach (DE)

(72) Inventors: Scott Angel, Marshallville, OH (US); Daniel Linton, North Canton, OH (US); Brian Zaugg, Millersburg, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 251 days.

(21) Appl. No.: 17/668,634

(22) Filed: Feb. 10, 2022

(65) Prior Publication Data

US 2023/0249536 A1    Aug. 10, 2023

(51) Int. Cl.
*B60K 6/387*    (2007.10)
*B60K 6/40*    (2007.10)

(52) U.S. Cl.
CPC ............. *B60K 6/40* (2013.01); *B60K 6/387* (2013.01)

(58) Field of Classification Search
CPC ....... F16H 45/00–2045/0294; B60K 6/20–547
See application file for complete search history.

(56) References Cited

U.S. PATENT DOCUMENTS

| | | | | |
|---|---|---|---|---|
| 6,478,101 B1* | 11/2002 | Taniguchi | ............... | B60K 6/547 903/905 |
| 6,628,021 B2* | 9/2003 | Shinohara | ............... | B60K 6/547 310/68 B |
| 7,111,698 B2* | 9/2006 | Tajima | ..................... | B60K 6/40 180/65.6 |
| 10,821,819 B2* | 11/2020 | Heuver | ..................... | B60K 6/40 |
| 11,111,992 B2* | 9/2021 | Steiner | ..................... | F16D 21/00 |
| 2002/0036434 A1* | 3/2002 | Tsuzuki | ................. | B60K 6/485 903/952 |
| 2004/0130225 A1* | 7/2004 | Mencher | ................... | B60K 6/40 903/952 |
| 2005/0150734 A1* | 7/2005 | Breier | ..................... | B60K 6/405 903/952 |
| 2017/0353074 A1* | 12/2017 | Takahashi | ................ | H02K 1/08 |
| 2021/0270353 A1* | 9/2021 | Blischak | .................. | B60K 6/40 |

FOREIGN PATENT DOCUMENTS

JP    2009097358 A    *    5/2009

* cited by examiner

*Primary Examiner* — Ernesto A Suarez
*Assistant Examiner* — Lillian T Nguyen
(74) *Attorney, Agent, or Firm* — Volpe Koenig

(57) ABSTRACT

A drive arrangement for a torque converter is disclosed herein. The drive arrangement includes a first drive plate element configured to be connected to a torque converter cover and configured to secure a rotor of an electric motor against the torque converter cover. A second drive plate element is configured to be connected to a flex plate, and the first and second drive plate elements are connected to each other.

13 Claims, 10 Drawing Sheets

DRIVE PLATE CONFIGURATION FOR TORQUE CONVERTER

FIELD OF INVENTION

The present disclosure is directed to a torque converter, and is more particularly related to a drive plate for a torque converter.

BACKGROUND

Hybrid modules including torque converter assemblies are well known. In known arrangements, such as shown in FIG. 1, an electric motor 2 is generally arranged on a torque converter cover 3, and a drive plate 4 is attached to the torque converter cover 3. During assembly, a rotor 5 of the electric motor 2 must be magnetized. Due to the geometry of the torque converter assembly, the drive plate 4 interferes with this magnetization step and results in the rotor 5 being insufficiently magnetized. This issue is primarily due to an insufficient clearance around the rotor 5.

Accordingly, there is a need to provide an arrangement in which clearance or space around the rotor is increased such that the rotor can be magnetized during assembly.

SUMMARY

The present disclosure includes a modified drive plate configuration that addresses the issues identified above.

A drive arrangement for a torque converter is disclosed herein. The drive arrangement includes a first drive plate element configured to be connected to a torque converter cover and configured to secure a rotor of an electric motor against the torque converter cover. A second drive plate element is configured to be connected to a flex plate. The first and second drive plate elements are connected to each other through a fastener, connector, or other means.

The first drive plate element and the second drive plate element are connected to each other via at least one fastener, in one aspect. The at least one fastener can be a plurality of bolts.

A first spacer plate can be arranged to directly engage against the first drive plate element, and the first spacer plate is configured to engage against the rotor. A second spacer plate is arranged on an opposite axial side of the rotor from the first spacer plate, and the first and second spacer plates include engagement elements configured to rotationally lock with the rotor.

The first drive plate element can be configured to be connected to the torque converter cover via welding.

Adhesive or epoxy can be arranged between the rotor and the torque converter cover.

A biasing element can be arranged between the first drive plate element and the rotor, in one aspect.

A biasing plate can be arranged between the first drive plate element and the rotor, in another aspect.

A mating feature can be arranged between an inner diameter of the rotor and an outer diameter of the torque converter cover, in one aspect.

An axially clamping element can be attached to the first drive plate element and configured to engage around a portion of the rotor.

The second drive plate element can be formed as a stamped plate, and the first drive plate element can be formed as a ring.

A method of assembling a drive arrangement for a torque converter assembly is also disclosed herein.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
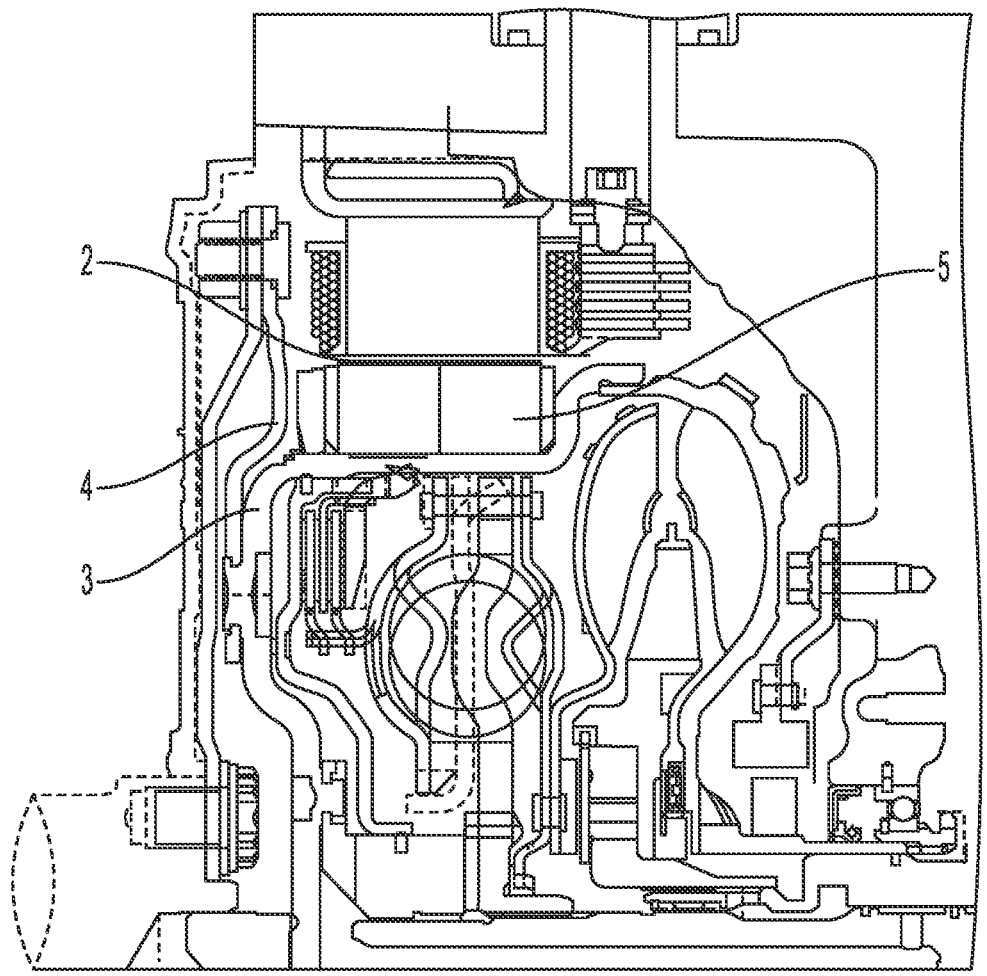
FIG. 1 is a cross-sectional view of a hybrid module including a torque converter according to the prior art.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A hybrid module 10 including a torque converter is disclosed herein. As shown in FIGS. 2A-2D, the hybrid module 10 includes a drive plate that is split into two different components: a first drive plate element 20 and a second drive plate element 30. As used in this context, the second drive plate element 30 is formed as a plate. In one aspect, the second drive plate element 30 is formed as a stamped plate. In one aspect, the first drive plate element 20 is formed as a ring. In one aspect, the second drive plate element 30 has a larger radial dimension than the first drive plate element 20, and the second drive plate element 30 has a smaller axial dimension than the first drive plate element 20.

The second drive plate element 30 is configured to be connected to a flex plate 15, which is configured to be connected to the engine's crankshaft. The second drive plate element 30 can be connected to the flex plate 15 via at least one fastener or connector 16.

The first drive plate element 20 is connected to the second drive plate element 30. In one aspect, the first and second drive plate elements 20, 30 are connected to each other are connected to each other via fasteners 25. In one aspect, the fasteners 25 can include bolts, rivets, or other types of mechanical fasteners. One of ordinary skill in the art would understand that various types of fasteners or connectors could be used.

The first drive plate element 20 is configured to be connected to a torque converter cover 50. The first drive plate element 20 is connected to the torque converter cover 50 via a welding connection 35, in one aspect. One of ordinary skill in the art would understand that various types of connections can be provided.

The first drive plate element 20 is configured to secure a rotor 40 of an electric motor with the torque converter cover 50. As used in this context, the term secure means the first drive plate element 20 provides an axial stop relative to the rotor 40. In one aspect, this support or stop can be provided directly or indirectly. The rotor 40 can be formed from two adjacent halves or portions 42a, 42b that are rotationally fixed to each other. In one aspect, the two rotor portions 42a, 42b are similar, but are rotationally offset from one another during assembly to the outside of the torque converter cover 50. In one aspect, the rotational offset can improve efficiency of the motor. One of ordinary skill in the art would understand that any skewing between the two rotor portions 42a, 42b can be achieved using a variety of configurations, such as some type of retaining feature or key to aid in relative positioning of the two rotor portions 42a, 42b. The connection between the rotor portions 42a, 42b can be pressed together, such as via an axial force or preload, through various configurations described herein.

The torque converter cover 50 has a bent configuration with a radial flange 52 defining an axial stop for the rotor 40 on an opposite side from the first drive plate element 20. A preload or force can be applied to first drive plate element 20 to provide a connection between the rotor 40 and the torque converter cover 50.

In one aspect, a first spacer plate 55a is arranged between the rotor 40 and the first drive plate element 20 on a first axial end of the rotor 40, and a second spacer plate 55b is arranged on a second axial end of the rotor 40 against the torque converter cover 50.

Figure 7:
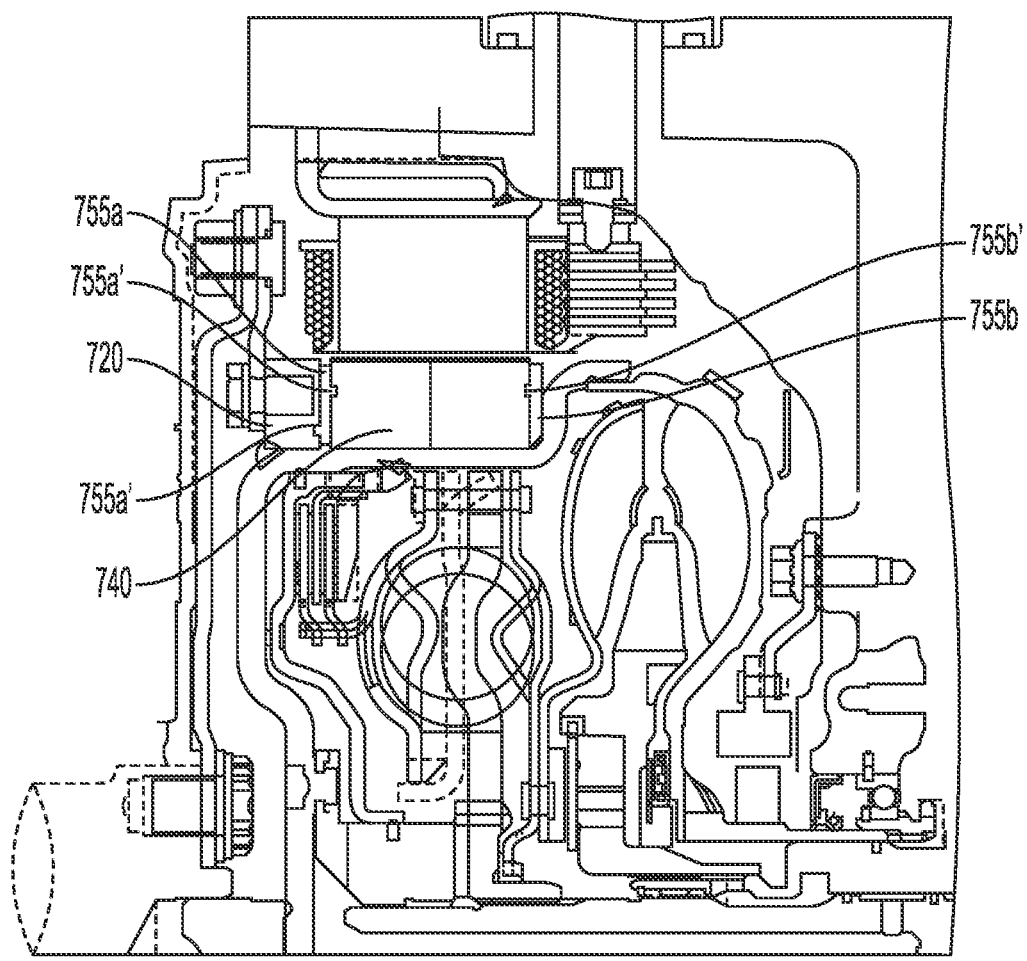
FIG. 7 is a side cross-sectional view of a hybrid module according to another embodiment.

In one aspect, as shown in FIG. 7, the first and second spacer plates 755a, 755b can include engagement elements 755a', 755b' configured to rotationally lock with the rotor 730. The engagement elements 755a', 755b' can include protrusions that are configured to engaged in corresponding openings in the rotor 740, the first drive plate element 720, and any other adjacent components. The first spacer plate 755a can include at least one engagement element 755a' that engages the first drive plate element 720.

Figure 2A:
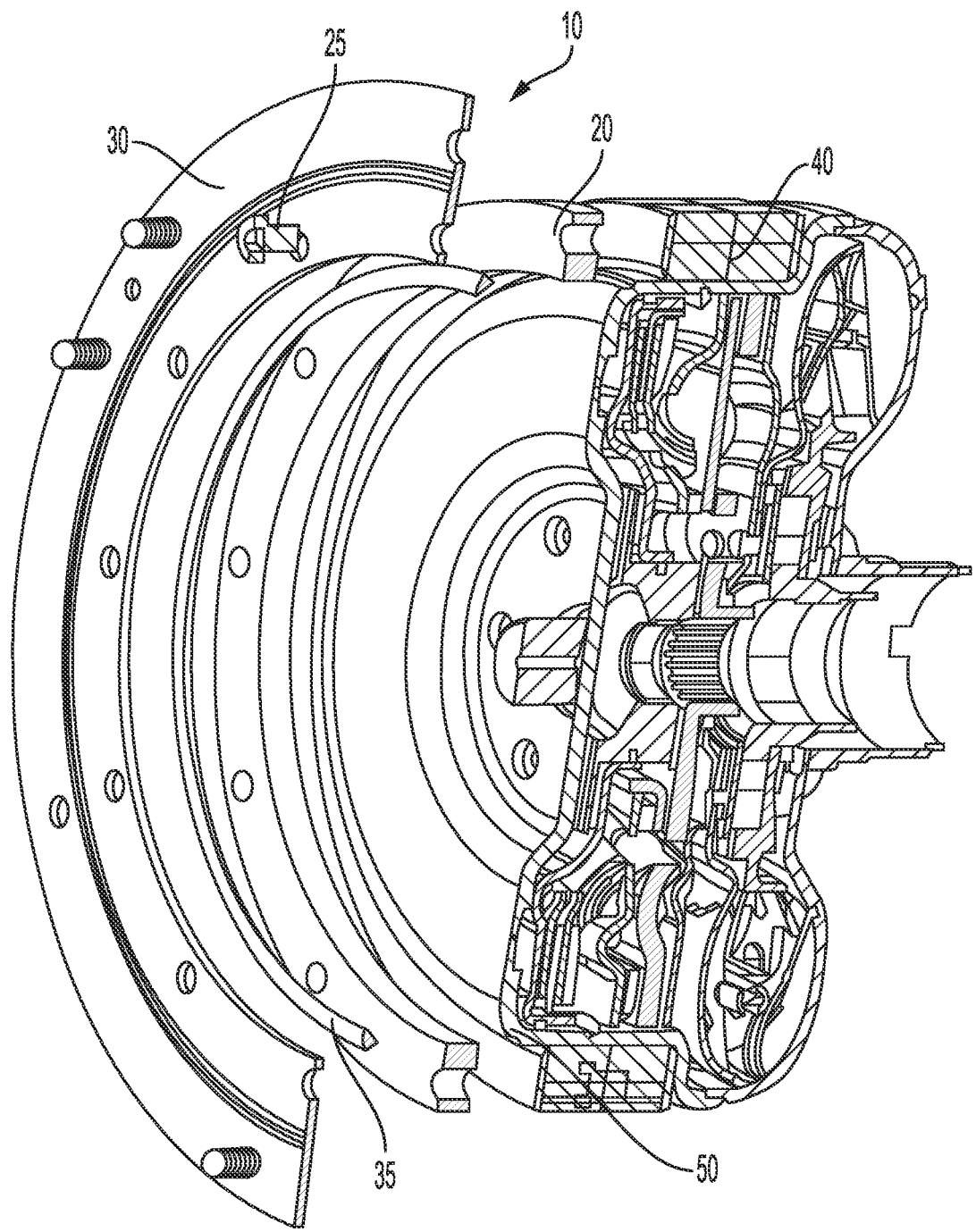
FIG. 2A is a perspective cross-sectional view of a hybrid module in a partially exploded state and including a drive plate according to one embodiment.
Figure 2B:
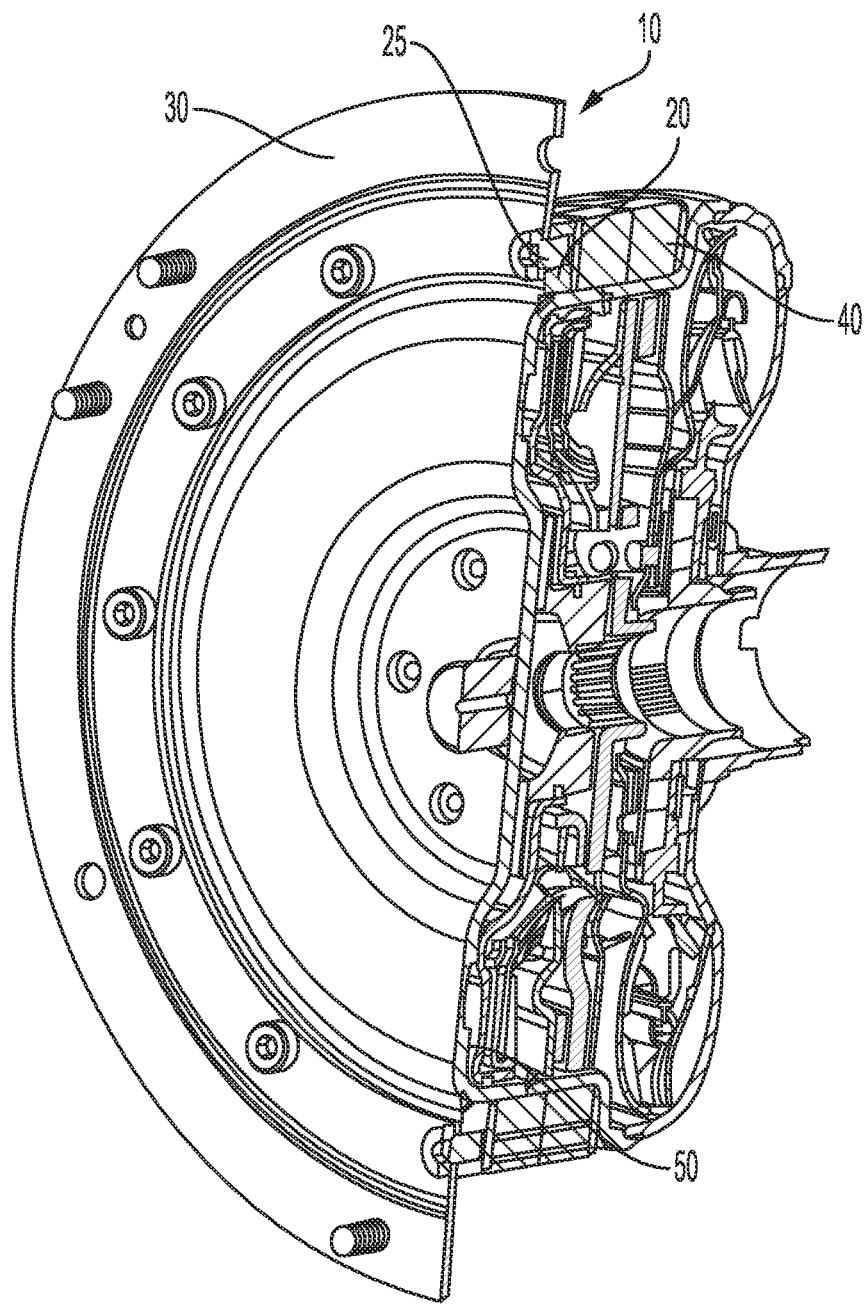
FIG. 2B is a perspective cross-sectional view of the hybrid module of FIG. 2A in an assembled state.
Figure 2C:
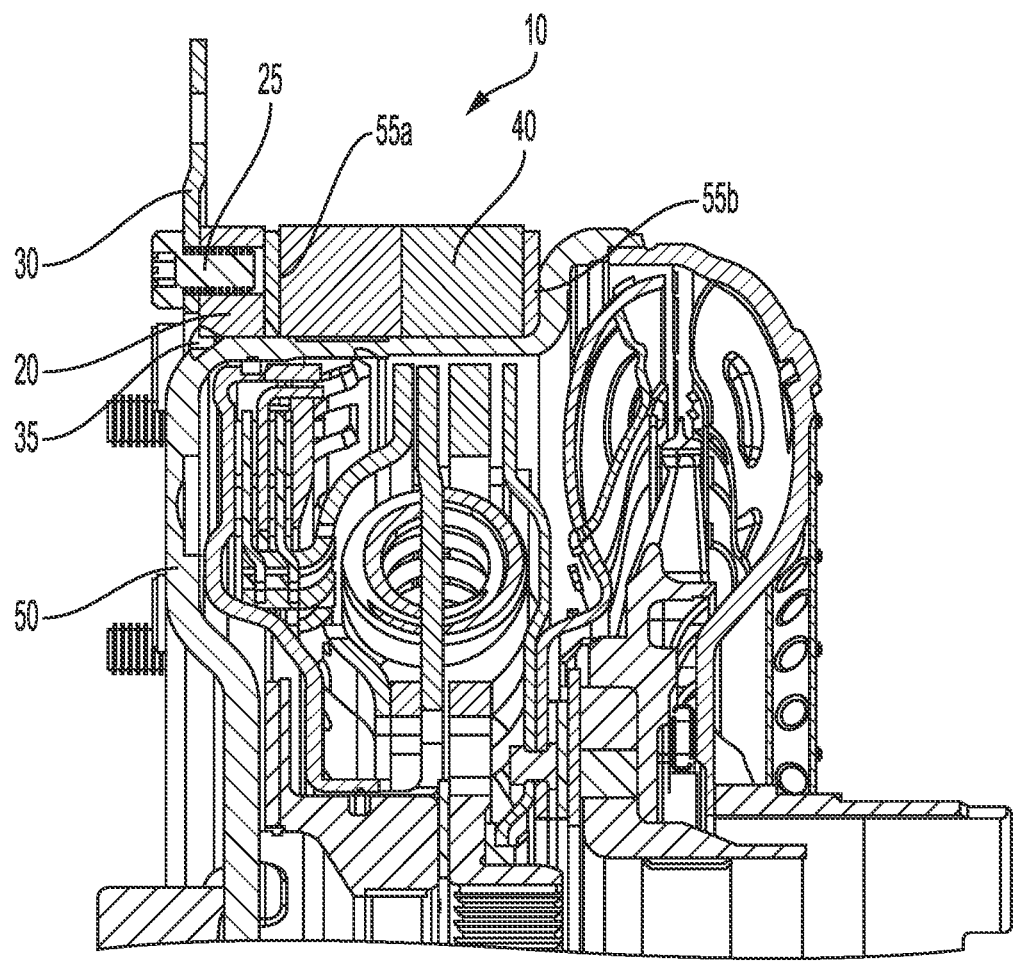
FIG. 2C is a side cross-sectional view of the hybrid module of FIGS. 2A and 2B.
Figure 2D:
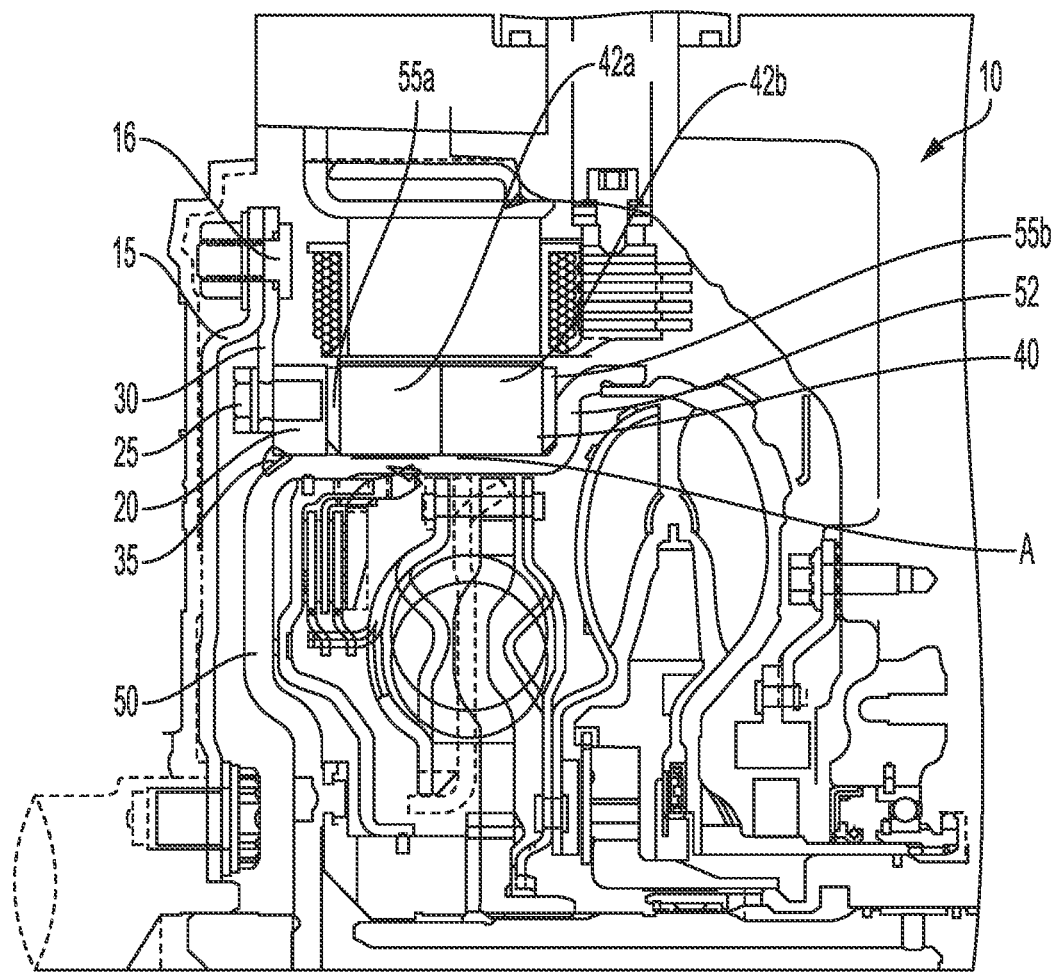
FIG. 2D is an additional side cross-sectional view of the hybrid module of FIGS. 2A-2C.

In one aspect, as shown in FIG. 2D, an area (A) defined in a radial region between the rotor 40 and an axial portion of the torque converter cover 50 includes an epoxy or adhesive to further rotationally lock or connect the rotor 40 with the torque converter cover 50. One of ordinary skill in the art would understand that a keyed connection or groove and mating feature could be provided in this area (A).

Figure 3:
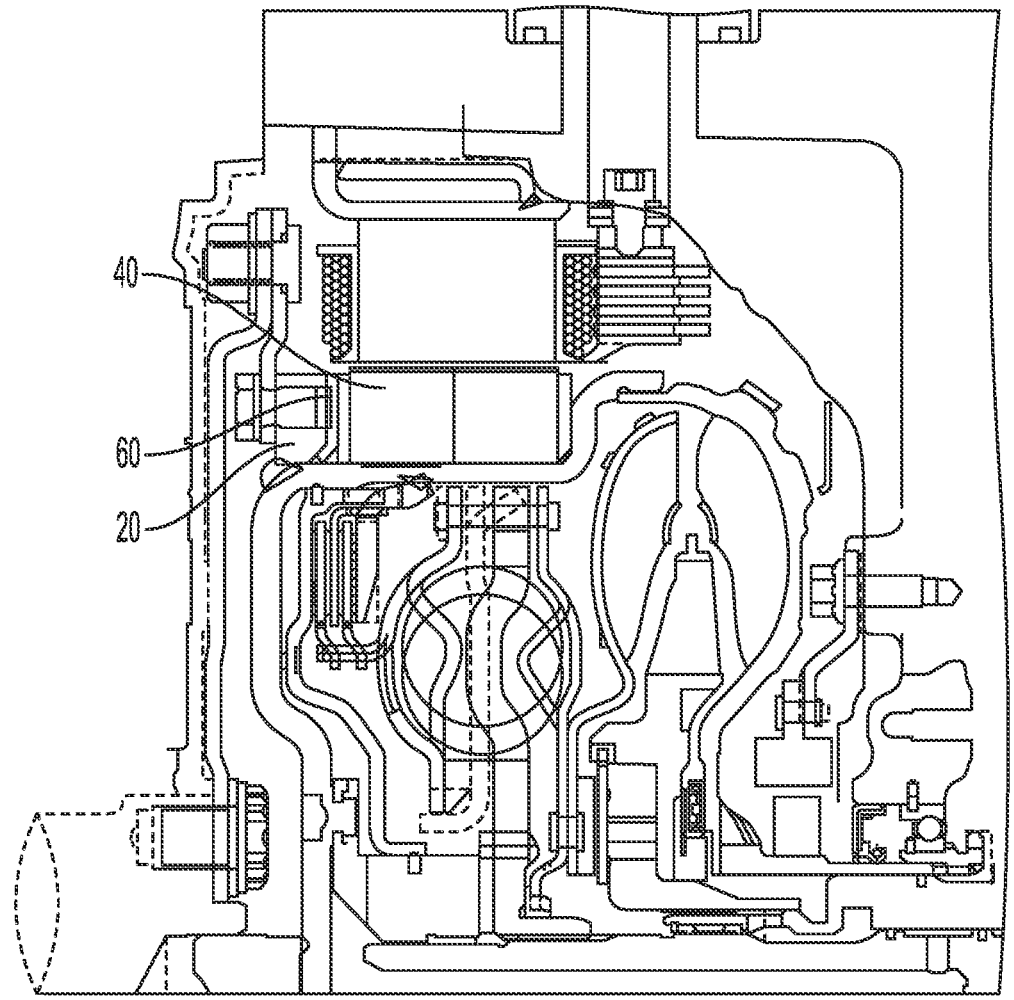
FIG. 3 is a side cross-sectional view of a hybrid module according to another embodiment.

As shown in FIG. 3, a biasing element 60 can be arranged between the first drive plate element 20 and the rotor 40. In one aspect, the biasing element 60 is a diaphragm spring. The biasing element 60 can provide a load to rotationally connect or lock the first drive plate element 20, the rotor 40, and the torque converter cover 50.

Figure 4:
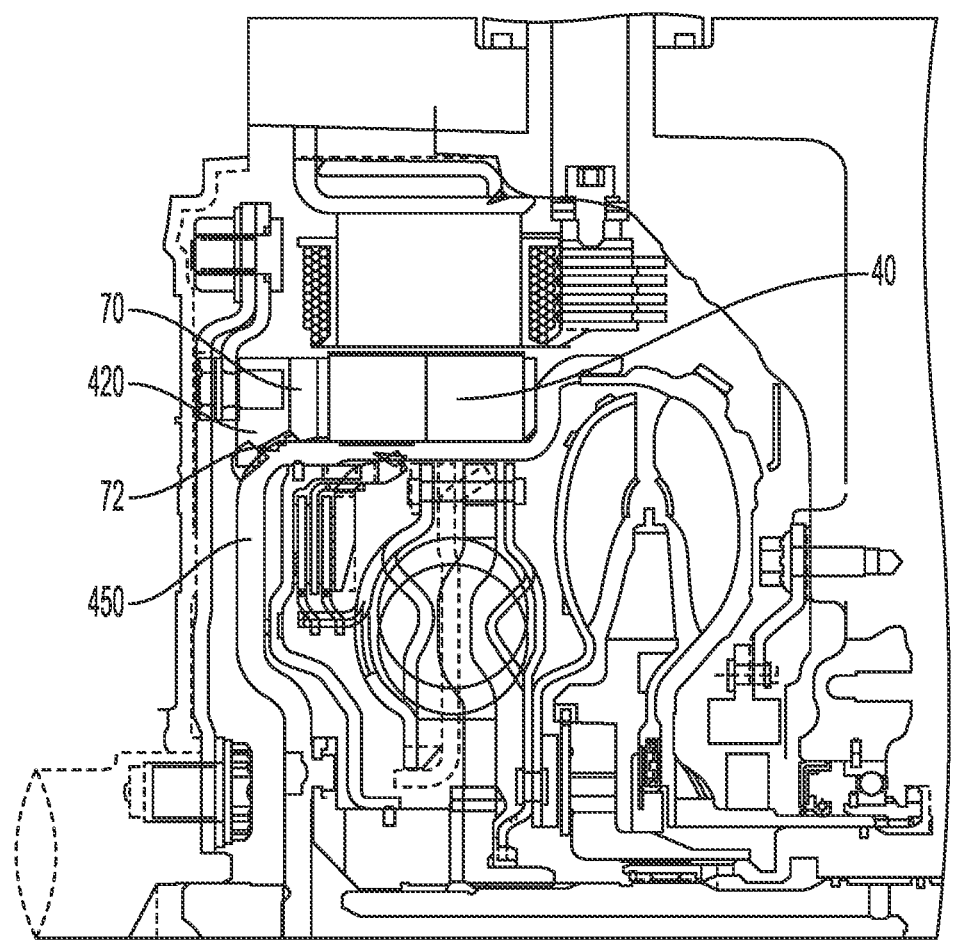
FIG. 4 is a side cross-sectional view of a hybrid module according to another embodiment.

As shown in FIG. 4, a biasing plate 70 is arranged between the first drive plate element 420 and the rotor 40. The biasing plate 70 can include a staking portion 72 that is configured to attach the biasing plate 70 to the torque converter cover 450.

Figure 5:
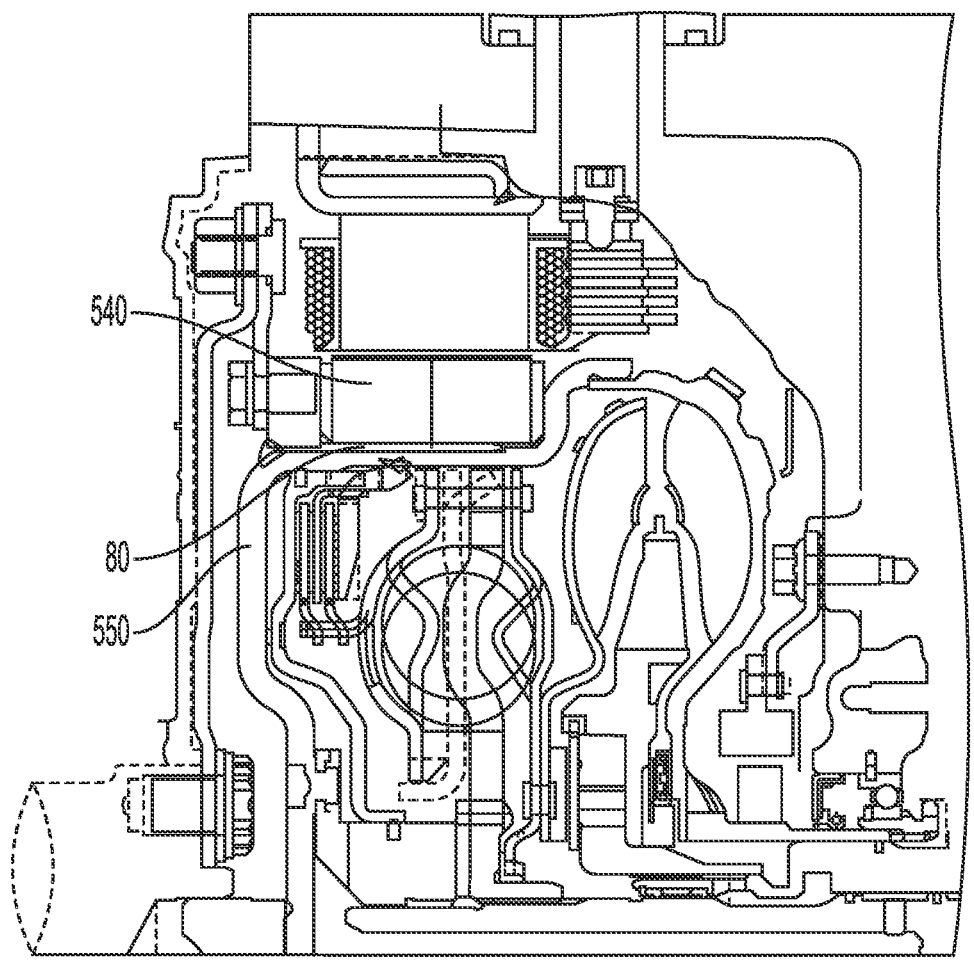
FIG. 5 is a side cross-sectional view of a hybrid module according to another embodiment.

As shown in FIG. 5, a mating feature 80 is arranged between an inner diameter of the rotor 540 and an outer diameter of the torque converter cover 550. In this arrangement the mating feature 80 can include a male and female type mating connection, keyed connection, or other type of attachment or connection arrangement that rotationally joins the rotor 540 with the torque converter cover 550. In one aspect, this connection is a splined connection or other irregular or non-round or smooth interface.

Figure 6:
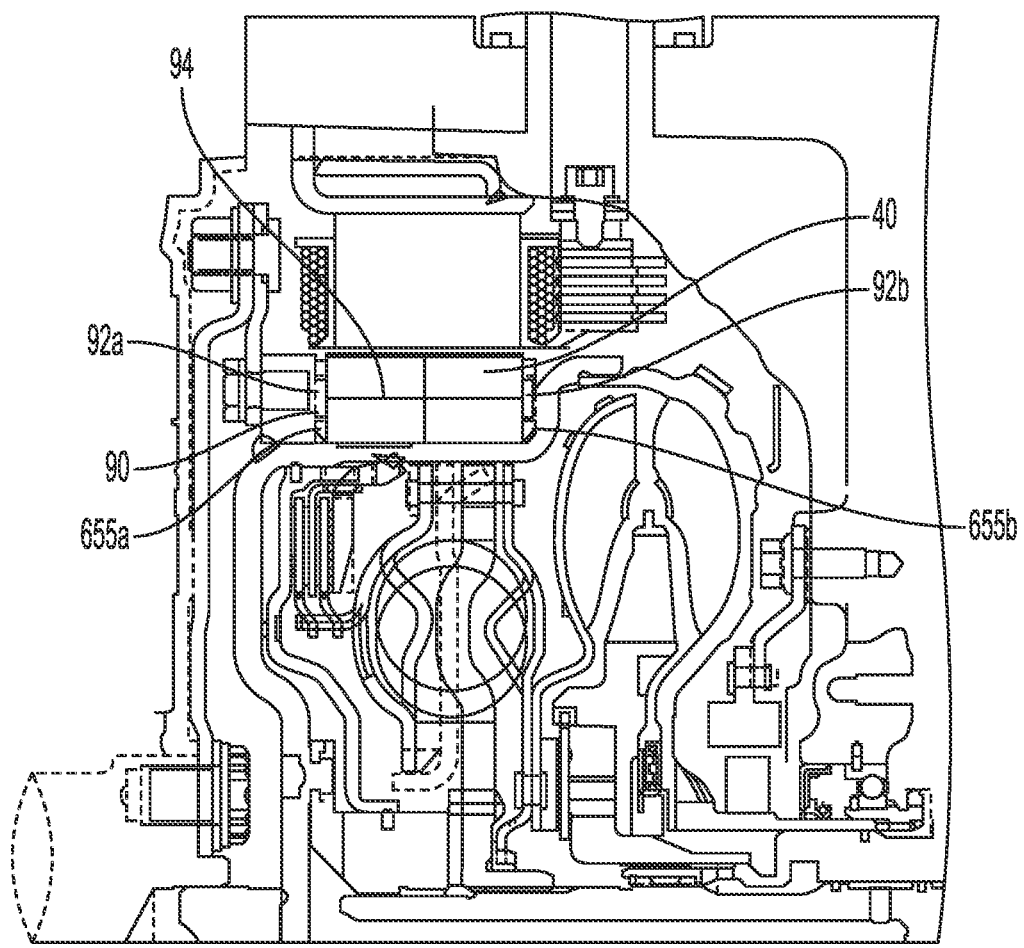
FIG. 6 is a side cross-sectional view of a hybrid module according to another embodiment.

As shown in FIG. 6, a clamping element 90 can be provided. In one aspect, the clamping element 90 provides an axial clamping force to the rotor 40. The clamping element 90 can include a first end 92a connected to the first spacer plate 655a and a second end 92b connected to the second spacer plate 655b. A connector 94, such as a cables or other fastening means, can be used to secure components of the rotor 40 with each other.

A method of assembling a drive arrangement for a hybrid module including a torque converter is also disclosed herein. The method includes arranging an electric motor including a rotor 40 around a torque converter cover 50. Once the rotor 40 is in place, at least one portion of a drive plate is attached to the torque converter cover 50. In one aspect, the at least one portion of the drive plate is the first drive plate element 20. The first drive plate element 20 can be welded to the torque converter cover 50. After this step, the rotor 40 can be magnetized. After magnetization of the rotor 40, another portion of the drive plate (i.e. the second drive plate element 30) can be attached to the portion of the drive plate that is already welded or connected to the torque converter cover 50. The second drive plate element 30 is then attached or connected to the flex plate 15. Additional method steps could be provided, as one of ordinary skill in the art would appreciate.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS electric motor 2
torque converter cover 3
drive plate 4
rotor 5
hybrid module 10
flex plate 15
fastener 16
first drive plate element 20, 420, 720
fasteners 25
second drive plate element 30
welding connection 35
rotor 40, 540, 740 rotor portions 42a, 42b
torque converter cover 50, 450, 550
radial flange 52
first and second spacer plates 55a, 55b, 655a, 655b, 755a, 755b
biasing element 60
biasing plate 70
staking portion 72
mating feature 80
clamping element 90
first and second ends 92a, 92b of clamping element 90
connector 94

What is claimed is:

1. A drive arrangement for a torque converter, the drive arrangement comprising:
   a first drive plate element configured to be connected to a torque converter cover and configured to secure a rotor of an electric motor against the torque converter cover;
   a second drive plate element that is separately formed from the first drive plate element, the second drive plate element being configured to be connected to a flex plate; and
   a first spacer plate that directly engages against the first drive plate element, and the first spacer plate is configured to engage against the rotor.

2. The drive arrangement according to claim 1, wherein the first drive plate element and the second drive plate element are connected to each other via at least one fastener.

3. The drive arrangement according to claim 2, wherein the at least one fastener is a bolt.

4. The drive arrangement according to claim 1, further comprising a second spacer plate on an opposite axial side of the rotor from the first spacer plate, wherein the first and second spacer plates include engagement elements configured to rotationally lock with the rotor.

5. The drive arrangement according to claim 1, wherein the first drive plate element is configured to be connected to the torque converter cover via welding.

6. The drive arrangement according to claim 1, further comprising an adhesive between the rotor and the torque converter cover.

7. The drive arrangement according to claim 1, further comprising a biasing element arranged between the first drive plate element and the rotor.

8. The drive arrangement according to claim 1, further comprising a biasing plate arranged between the first drive plate element and the rotor.

9. The drive arrangement according to claim 1, further comprising a mating feature between an inner diameter of the rotor and an outer diameter of the torque converter cover.

10. The drive arrangement according to claim 1, wherein the second drive plate element is formed as a stamped plate.

11. The drive arrangement according to claim 1, wherein the first drive plate element is formed as a ring.

12. The drive arrangement according to claim 1, wherein the second drive plate element is formed as a stamped plate, the first drive plate element is formed as a ring, and the second drive plate element has a smaller thickness than a thickness of the first drive plate element.

13. A drive arrangement for a torque converter, the drive arrangement comprising:
   a first drive plate element configured to be connected to a torque converter cover and configured to secure a rotor of an electric motor against the torque converter cover;
   a second drive plate element that is separately formed from the first drive plate element, the second drive plate element being configured to be connected to a flex plate; and
   an axially clamping element attached to the first drive plate element and configured to engage around a periphery of the rotor.

* * * * *